US011023366B2

(12) United States Patent
Ackerman et al.

(10) Patent No.: US 11,023,366 B2
(45) Date of Patent: Jun. 1, 2021

(54) DIMINUTION OF TEST TEMPLATES IN TEST SUITES (71) Applicant: International Business Machines Corporation, Armonk, NY (US)

(72) Inventors: Samuel Solomon Ackerman, Haifa (IL); Raviv Gal, Kamon (IL); Anatoly Koyfman, Kiriat Yam (IL); Avi Ziv, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 31 days.

(21) Appl. No.: 16/666,457

(22) Filed: Oct. 29, 2019

(65) Prior Publication Data

US 2021/0124676 A1     Apr. 29, 2021

(51) Int. Cl.
*G06F 11/36*     (2006.01)
(52) U.S. Cl.
CPC ........ *G06F 11/3688* (2013.01); *G06F 11/368* (2013.01); *G06F 11/3676* (2013.01); *G06F 11/3684* (2013.01); *G06F 11/3692* (2013.01)
(58) Field of Classification Search
None
See application file for complete search history.

(56) References Cited

U.S. PATENT DOCUMENTS

| | | | | |
|---|---|---|---|---|
| 8,701,092 | B1* | 4/2014 | Colcord | G06F 11/3688 717/127 |
| 9,910,941 | B2* | 3/2018 | Dusanapudi | G06F 11/2257 |
| 2006/0229860 | A1* | 10/2006 | Azatchi | G06F 30/20 703/14 |
| 2007/0010975 | A1* | 1/2007 | Fine | G06F 30/3323 703/2 |
| 2020/0341875 | A1* | 10/2020 | Adiga | G06F 11/2236 |
| 2020/0364134 | A1* | 11/2020 | Gal | G06F 11/3676 |

OTHER PUBLICATIONS

Gal, "Template Aware Coverage—Taking Coverage Analysis to the Next Level", 2017, ACM (Year: 2017).*
Arar, "The Verification Cockpit—Creating the Dream Playground for Data Analytics over the Verification Process", 2015, Springer International Publishing (Year: 2015).*

(Continued)

*Primary Examiner* — Hossain M Morshed
(74) *Attorney, Agent, or Firm* — Ziv Glazberg (57) ABSTRACT

A method, apparatus and product for reducing a number of test templates in a test suite. The method comprises determining, for a first test template of the test suite, a first probabilities vector comprising a first plurality of coverage probabilities with respect to a set of coverage events. The method comprises determining, for a second test template of the test suite, a second probabilities vector comprising a second plurality of coverage probabilities with respect to the set of coverage events. The method further comprises determining that the first test template is statistically dominant over the second test template based on the first probabilities vector and based on the second probabilities vector. The method further comprises providing an output based on the determination of the statistically dominant test template.

20 Claims, 3 Drawing Sheets

(56) References Cited

OTHER PUBLICATIONS

"Method and tool for measuring test-template variability", IP.com, May 29, 2013.

Moab Arar et al., "The Verification Cockpit—Creating the Dream Playground for Data Analytics over the Verification Process", Hardware and Software: Verification and Testing: 11th International Haifa Verification Conference, HVC 2015, Haifa, Israel, Nov. 17-19, 2015, Proceedings (pp. 51-66).

* cited by examiner

DIMINUTION OF TEST TEMPLATES IN TEST SUITES

TECHNICAL FIELD

The present disclosure relates to system testing in general, and to methods, products and systems of reducing a number of test templates in a test suite, in particular.

BACKGROUND

Computerized devices control almost every aspect of our life—from writing documents to controlling traffic lights. However, computerized devices are bug-prone, and thus require a testing and verification phase in which the bugs should be discovered. The testing and verification phase is considered one of the most difficult tasks in designing a computerized device. The cost of not discovering a bug may be enormous, as the consequences of the bug may be disastrous. For example, a bug may cause the injury of a person relying on the designated behavior of the computerized device. Additionally, a bug in hardware or firmware may be expensive to fix, as patching it requires call-back of the computerized device. Hence, many developers of computerized devices invest a substantial portion, such as 70%, of the development cycle to discover erroneous behaviors of the computerized device.

A growing complexity and size of testing and verification on the one hand, and the availability of a growing number of testing and verification tools that produce large amounts of data on the other hand, causes a shift in the verification domain. From a world that contains little data, the verification domain has turned into a world with too much data that can drown a verification team.

BRIEF SUMMARY

One exemplary embodiment of the disclosed subject matter is a method comprising: determining, for a first test template of a test suite, a first probabilities vector comprising a first plurality of coverage probabilities with respect to a set of coverage events, wherein a coverage probability of a test template indicates a probability of covering a corresponding coverage event by a test that is generated based on the test template, wherein the coverage probability of the test template is determined based on a count of tests that are generated using the test template and cover the coverage event out of a total count of tests that are generated using the test template; determining, for a second test template of the test suite, a second probabilities vector comprising a second plurality of coverage probabilities with respect to the set of coverage events; determining that the first test template is statistically dominant over the second test template based on the first probabilities vector and based on the second probabilities vector; and providing an output based on the determination of the statistically dominant test template.

Another exemplary embodiment of the disclosed subject matter is a computer program product including a non-transitory computer readable storage medium retaining program instructions, which program instructions when read by a processor, cause the processor to perform a method including: determining, for a first test template of a test suite, a first probabilities vector comprising a first plurality of coverage probabilities with respect to a set of coverage events, wherein a coverage probability of a test template indicates a probability of covering a corresponding coverage event by a test that is generated based on the test template, wherein the coverage probability of the test template is determined based on a count of tests that are generated using the test template and cover the coverage event out of a total count of tests that are generated using the test template; determining, for a second test template of the test suite, a second probabilities vector comprising a second plurality of coverage probabilities with respect to the set of coverage events; determining that the first test template is statistically dominant over the second test template based on the first probabilities vector and based on the second probabilities vector; and providing an output based on the determination of the statistically dominant test template.

Yet another exemplary embodiment of the disclosed subject matter is a computerized apparatus having a processor, the processor being adapted to perform the steps of: determining, for a first test template of a test suite, a first probabilities vector comprising a first plurality of coverage probabilities with respect to a set of coverage events, wherein a coverage probability of a test template indicates a probability of covering a corresponding coverage event by a test that is generated based on the test template, wherein the coverage probability of the test template is determined based on a count of tests that are generated using the test template and cover the coverage event out of a total count of tests that are generated using the test template; determining, for a second test template of the test suite, a second probabilities vector comprising a second plurality of coverage probabilities with respect to the set of coverage events; determining that the first test template is statistically dominant over the second test template based on the first probabilities vector and based on the second probabilities vector; and providing an output based on the determination of the statistically dominant test template.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

One technical problem dealt with by the disclosed subject matter is diminution of test templates in test suites. In some exemplary embodiments, it may be desired to remove unnecessary or unbeneficial test templates from a test suite. In some exemplary embodiments, providing a test suite that only retains efficient test templates may be desired to enhance a testing and verification phase of a system and decrease computational and memory usage. In some exemplary embodiments, it may be desired to provide a test suite that does not include duplicate test templates that substantially cover the same coverage events or that are generally aimed at covering the same aspects of the system.

Another technical problem dealt with by the disclosed subject matter is removing obsolete test templates, which may typically require special expertise or testing knowledge regarding each designated test template. It may be desired to eliminate a dependency on special expertise of certain verification team members by determining an independent method of identifying obsolete test templates.

In some exemplary embodiments, the testing and verification phase may utilize at least one test generator (also referred to as a "stimuli generator" or "random-test-generator") configured to generate one or more test instances, test cases, stimuli, or the like, using corresponding test templates. In some exemplary embodiments, the test generator may be configured to receive a plurality of test templates as an input, and utilize the plurality of test templates to guide a generation of stimuli for verification purposes such as hardware verification purposes, or the like. In some exemplary embodiments, based on the test templates, stimuli generators may produce test cases and corresponding runtime environments over which the generated test cases may be executed.

In some exemplary embodiments, a plurality of test templates of a system may be kept or stored as part of a test suite. In some exemplary embodiments, the test suite may include a large number of test templates, which, when utilized, may result in an even larger number of test cases. For example, verification of large and complex systems may require hundreds and even tens of thousands of test templates, which may be used to generate millions of test cases.

In some exemplary embodiments, a test template may describe a test flow, while introducing randomness to the test. In some exemplary embodiments, a random-test-generator may use the directives defined in a test template setting to make random decisions in generating the concrete test. For example, if a test template aims to verify a multiple operation, then the test template can include executing K multiple operations. The test template may define a directive to control the sign of each operand (e.g., positive, zero or negative), by defining "weight" for each option. The random-test-generator may use the directive and the weights to produce the K multiple operations. Each time the random-test-generator may generate a different test having K multiple operations that adhere to the requirements of the test template. In some exemplary embodiments, the random-test-generator may define a Constraint Satisfaction Problem (CSP) based on the test template, and utilize a CSP solver to determine concrete values that meet the requirements of the test template, thereby defining a random test that adheres to the constraints defined in the test template. In some exemplary embodiments, soft constraints in the CSP may be utilized to implement directives relating to the biasing the end-result, such as biasing randomness using weights.

It is further noted that the example above is a simplistic example where the relationship between the definitions in the test template and the coverage event is straightforward. In real-life examples, the relationship may not be so easily identifiable and controlled, such as a relationship that is based on a chain of indirect properties that cannot be controlled directly by a directive in the test template.

In some exemplary embodiments, a progress or success of the testing and verification phase may be measured according to a coverage criterion, which may relate to a number of predefined target coverage events that may be activated or reached by the generated tests, a type thereof, or the like. Coverage tools for checking software and hardware components of the device may provide a measure of how well the software or hardware being evaluated has been exercised during the testing and verification phase, and thereby give a level of assurance that the device is of high quality. In some cases, the coverage criterion may be utilized for assessing the quality of the testing and verification phase and the quality of the test templates that were used during the testing and verification phase.

In some exemplary embodiments, a set of target coverage events for the testing and verification phase may be identified, and tests may be generated based on test templates that are configured to cover the identified coverage events. In some exemplary embodiments, the identified coverage events may be utilized to assess coverage of a testing performed up to a given point, e.g., using simulation techniques. In some exemplary embodiments, a number of times the coverage events are hit or activated by each generated test may be measured for estimating a rate of the coverage criterion, while the more coverage events are activated, the higher the coverage criterion may be scored.

In some exemplary embodiments, as the verification process proceeds, many test templates may become obsolete, unnecessary, or the like. In some cases, a test template may become obsolete when coverage events it facilitates to activate are already better targeted by other test templates. For example, this may be the case due to continuous changes to a system's structure, function, or the like, which may cause test templates to over live their coverage usefulness. As an example, a test template may be produced for a certain design or function of a certain system. In some cases, the design or function of the system may be modified over the years, thus causing the test template to become irrelevant. As another example, a first test template may be produced for testing a certain function, and a second test template may be produced subsequently to the first test template. In some cases, the second test template may provide a better coverage than the first test template, at least regarding the certain function. Accordingly, the first test template may be considered to be obsolete, unnecessary, or the like.

In some exemplary embodiments, removing obsolete test templates from the test suite may significantly increase an efficiency of the testing and verification phase at least since it may free computational resources to utilize better covering test templates. In some exemplary embodiments, even if obsolete test templates are not selected for active testing, retaining them in the test suite may bear a maintenance cost. As an example, obsolete test templates may be maintained manually to ensure that they can still be executed. As another example, obsolete test template may actually be executed to obtain up-to-date data regarding the events that they cover. In some cases, a number of obsolete test templates that can be removed at active verification stages may be estimated at 10-30% of all active test templates.

In some exemplary embodiments, removing a test template from the test suite may be a disruptive action that should not be taken easily. For example, test templates may be created or produced by original verification engineers which, over long time periods, may be replaced by new verification engineers that may not be familiar with the test templates and thus should be careful when dealing with the original test templates. In some cases, new verification engineers may typically be hesitant or reluctant to remove test templates from the test suite to avoid a risk of losing a test template that appears to be irrelevant but might nevertheless be relevant for a certain scenario. In some cases, it may be desired to enable new verification engineers, or any other user, to safely remove obsolete test templates without risking a removal of unique or necessary test templates.

One technical solution of the disclosed subject matter is to automatically identify obsolete templates of a test suite and enable a user to eliminate them. In some exemplary embodiments, the obsolete templates may be identified based on statistical comparisons of template coverage rates. In some exemplary embodiments, every two test templates may be compared to each other, to identify pairs of test templates in which one test template is better in a statistically significant manner than the other test template with respect to a set of coverage events. When such as pair is detected, the inferior template may be removed from the test suite since it may be inferior in all aspects.

In some exemplary embodiments, the test suite may include a plurality of test templates, including at least a first and second test template. In some exemplary embodiments, a first probabilities vector may be determined for the first test template, and a second probabilities vector may be determined for the second test template. In some exemplary embodiments, the first probabilities vector may include first coverage probabilities for covering a set of coverage events, and the second probabilities vector may include second coverage probabilities for covering the set of coverage events.

In some exemplary embodiments, a coverage probability of a test template may indicate a probability of covering or hitting a corresponding coverage event by a test that is generated based on the test template. In some exemplary embodiments, a coverage probability of a test template may be determined based on a count of tests that are generated using the test template and cover the coverage event, out of a total count of tests that are generated using the test template. For example, a test template that successfully covered an event 25 time out of 100 attempts during a time frame, may be assigned a coverage probability of a quarter. In some cases, if a coverage event is indicated in the first probabilities vector but not in the second probabilities vector, the coverage event may be added to the second probabilities vector with a probability of zero.

In some exemplary embodiments, the first test template may be determined to be statistically dominant over the second test template based on a comparison between the first probabilities vector and the second probabilities vector. In some exemplary embodiments, the first test template may be determined to be statistically dominant over the second test template based on a determination that none of the first coverage probabilities of the first probabilities vector are lower in a statistically significant manner than corresponding coverage probabilities of the second probabilities vector, and that at least one coverage probability of the first probabilities vector is higher in a statistically significant manner than a corresponding coverage probability of the second probabilities vector.

In some cases, the first and second test templates may be determined to be equal in a statistically significant manner In some exemplary embodiments, the first test template may be determined to be statistically equal to the second test template based on a determination that none of the first coverage probabilities of the first probabilities vector are lower in a statistically significant manner than corresponding coverage probabilities of the second probabilities vector, and that none of the first coverage probabilities of the first probabilities vector are higher in a statistically significant manner than corresponding coverage probabilities of the second probabilities vector.

In some cases, the first or second test templates may not share a statistically dominant relation at all. In some exemplary embodiments, the first test template may be determined to not share a statistically dominant relation with the second test template based on a determination that some of the first coverage probabilities of the first probabilities vector are lower in a statistically significant manner than corresponding coverage probabilities of the second probabilities vector, and that some of the first coverage probabilities of the first probabilities vector are higher in a statistically significant manner than corresponding coverage probabilities of the second probabilities vector.

In some exemplary embodiments, one or more frequently covered events from the set of coverage events may be identified. In some exemplary embodiments, a frequently covered event may be determined to have, for a plurality of test templates of the test suite, a coverage probability that is above a frequently covering threshold. In some exemplary embodiments, the frequently covered event may be determined based on a percentage of executed tests that covered the frequently covered event during a time frame. For example, the frequently covered event may exceed the frequently covering threshold when it achieves more than 1 coverage per 1,000 test executions, e.g., or any other frequently covering threshold.

In some exemplary embodiments, one or more frequently covered events may be excluded from the set of coverage events. For example, when determining whether or not the first test template is statistically dominant over the second test template, the frequently covered events may not be taken into account. In some cases, the frequently covered events may not be used for determination of the statistically dominant test template, e.g., since they may be considered unimportant. In some exemplary embodiments, there may not be a need to determine and exclude frequently covered events, for example, when each coverage probability of the first probabilities vector is higher or equal in a statistically significant manner than corresponding coverage probabilities of the second probabilities vector.

In some cases, a probability of covering a frequently covered event by the first test template may be determined to be lower in a statistically significant manner than a probability of covering the frequently covered event by the second test template. Nevertheless, the first test template may be determined to be statistically dominant over the second test template, e.g., regardless of any frequently covered events. In other cases, the probability of covering the frequently covered event by the first test template may be equal or higher in a statistically significant manner than the probability of covering the frequently covered event by the second test template.

In some exemplary embodiments, one or more well-covered events from the set of coverage events may be identified. In some exemplary embodiments, a well-covered event may be determined to have, for the first and second test templates, corresponding coverage probabilities that are above a well covering threshold. In some exemplary embodiments, the well covering threshold may be determined based on a percentage of executed tests that covered the well-covered event during a time frame. In some cases, the well-covered event may exceed the well covering threshold when it achieves a high coverage such as a coverage of more than 10% for both the first and second test templates. In other cases, any other well covering threshold may be defined.

In some exemplary embodiments, one or more well-covered events may be excluded from the set of coverage events. For example, when determining whether or not the first test template is statistically dominant over the second test template, the well-covered events may not be taken into account, e.g., since they are well covered by both test templates. In some cases, the well-covered events may not be used for determination of the statistically dominant test template. In some exemplary embodiments, there may not be a need to determine and exclude well-covered events, for example, when each coverage probability of the first probabilities vector is higher or equal in a statistically significant manner than corresponding coverage probabilities of the second probabilities s vector.

In some cases, a probability of covering a well-covered event by the first test template may be lower in a statistically significant manner than a probability of covering the well-covered event by the second test template. Nevertheless, the first test template may be determined to be statistically dominant over the second test template, e.g., regardless of any well-covered events. In other cases, the probability of covering the well-covered event by the first test template may be equal or higher in a statistically significant manner than the probability of covering the well-covered event by the second test template.

In some exemplary embodiments, an output may be provided based on determinations of statistically dominant test templates. In some cases, the output may include a recommendation of removing one or more inferior templates from the test suite. In some exemplary embodiments, an inferior test template may be a test template for which a dominant test template exists. For example, the output may include a recommendation of removing the second test template. In some exemplary embodiments, based on the recommendation, obsolete templates may be removed from the test suite, thereby providing a reduced test suite. In other cases, the output may include a reduced test suite that excludes obsolete templates from the test suite. In some exemplary embodiments, the reduced test suite may not include the second test template, which may be removed from the test suite.

In some exemplary embodiments, the reduced test suite may replace the original test suite. In some exemplary embodiments, a system may be verified by generating test cases to test the system based on test templates identified in the reduced test suite, and executing the tests to the system. In some exemplary embodiments, the reduced test suite may be utilized to test a system by determining coverage events for a target coverage goal, and selecting a subset of test templates from the reduced test suite to reach the target coverage goal.

In some exemplary embodiments, if there are a plurality of test templates that can be removed, the selection of one or more templates to be removed may be based on a heuristic. In some exemplary embodiments, there may be a maintenance complexity score for each test template, and the removal may be aimed at reducing the overall maintenance complexity score of the test suite. The maintenance complexity score may be set manually, automatically, or the like. In some embodiment, a classifier may be trained to provide a maintenance complexity score for a test template. In some exemplary embodiments, a creation date of each test template may be retained, and the selection may favor removal of older test templates, as the verification engineers that introduced them may no longer be on staff. Additionally, or alternatively, each test template may be associated with a name of its creator, and the selection may be based on a heuristic that is aimed to retain test templates created by the current staff, a list of which may be available.

It is noted that the disclosed subject matter may be applied orthogonally to the application of test template selection, where a set of test templates are selected in order to reach a desired coverage goal. Test template selection may be applied independently at each testing phase and may yield different sets of test templates at different times. Furthermore, test template selection does not include the deletion of a test template from the test suite, rather just a decision of whether to execute the test template or not for the current coverage goal.

One technical effect of the disclosed subject matter may be to remove obsolete test templates safely, without risking a removal of unique or necessary test templates.

Another technical effect of the disclosed subject matter may be reducing a number of test templates that need to be maintained, thus enabling to save simulation resources and enhancing a computational efficiency. In some cases, the obsolete test templates may be removed using statistical formulas that may be computationally efficient, thus reducing a computational cost of the testing and verification phase.

Yet another technical effect of the disclosed subject matter may be providing a verification team with decision support and enabling them to test features that need to be verified using a test suite that only holds relevant test templates. In some cases, removing obsolete test templates eliminates a requirement for a verification team to have special expertise or testing knowledge regarding the test templates.

The disclosed subject matter may provide for one or more technical improvements over any pre-existing technique and any technique that has previously become routine or conventional in the art.

Additional technical problem, solution and effects may be apparent to a person of ordinary skill in the art in view of the present disclosure.

Figure 1:
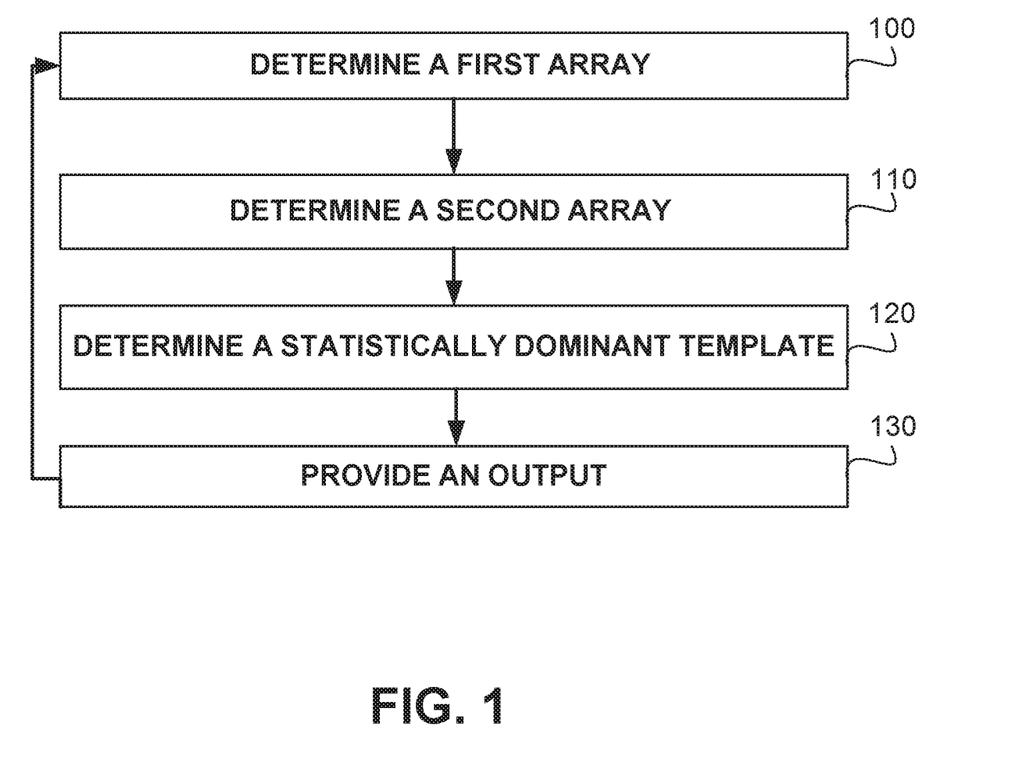
FIG. 1 illustrates a flowchart of a method, in accordance with some exemplary embodiments of the disclosed subject matter.

Referring now to FIG. 1 showing a flowchart diagram of a method, in accordance with some exemplary embodiments of the disclosed subject matter.

On Step 100, a first probabilities vector may be determined for a first test template of a test suite. In some exemplary embodiments, the first probabilities vector may include a first plurality of coverage probabilities with respect to a set of coverage events. In some exemplary embodiments, a coverage probability of a test template may indicate a probability of covering or hitting a corresponding coverage event by a test that is generated based on the test template.

In some exemplary embodiments, a coverage probability of a test template may be identified using a hit probability matrix, which may indicate a relation between a test template and its probabilistic coverage. In some exemplary embodiments, the hit probability matrix may indicate a connection between the origin test template and the coverage it achieves, based on previous testing results. In some cases, the hit probability matrix may provide feedback on how successful test templates are at hitting their targeted events, e.g., using functional coverage, line coverage, function coverage, branch coverage, or the like. In other cases, coverage probabilities may be identified or obtained from any other source using any other accumulated or obtained information.

In some exemplary embodiments, the hit probability matrix of the test suite may be defined as follows:

Let $T=(t_i)$ denote a test templates vector of size $|T|$ and let $E=(e_i)$ denote a coverage events vector of size $|E|$. The hit probability matrix, denoted $P_{hit}$, may be defined as follows:

$$P_{hit} = \begin{pmatrix} \cdots & \cdots & \cdots \\ \cdots & P_{i,j} & \cdots \\ \cdots & \cdots & \cdots \end{pmatrix} \quad (1)$$

wherein $P_{i,j}$ denotes a probability that a test instance generated from test template $t_i$ will hit event $e_j$, and wherein the columns correspond to different coverage events and the rows correspond to different test templates of the test suite.

In some exemplary embodiments, each row in the hit probability matrix may indicate coverage probabilities of a test template such as $t_i$ to cover the set of coverage events. In some exemplary embodiments, each row in the hit probability matrix correspond to a probabilities vector, thus the plurality of rows in the hit probability matrix may include at least one row that corresponds to the first probabilities vector.

In some exemplary embodiments, the hit probability matrix may be calculated using first order statistics of actual accumulated coverage information. In some exemplary embodiments, the statistics used to determine the hit probability matrix $P_{hit}$ may include, for each coverage probability of a test template, a count of test instances that are generated using the test template and cover the coverage event out of a total count of tests that are generated using the test template. In some exemplary embodiments, the coverage probability of the test template may be defined, e.g., as follows:

let $w_i$ denote a number of test instances generated from test template $t_i$ in a given time frame and let $hit_{i,j}$ denote a number of test instances generated from test template $t_i$ that hit event $e_j$ at least once during that time frame. Therefore, a probability that a test instance generated from test template $t_i$ will hit event $e_j$ may be, e.g., as follows:

$$P_{i,j} = \frac{hit_{i,j}}{w_i} \quad (2)$$

In some exemplary embodiments, the statistics used to determine the hit probability matrix $P_{hit}$ may be augmented with additional information, such as statistics on the number of times a test instance hits a given event, statistics on the length and effort required to generate and simulate test instances from each template, or the like.

In some exemplary embodiments, given the hit probability matrix $P_{hit}$ and a test execution policy $TP=(w_i)$ where $w_i$ is the number of test instances that are generated from template $t_i$, the probability of covering an event $e_j$ may be calculated, e.g., as follows:

$$P_j = 1 - \Pi_i (1 - P_{i,j})^{w_i} \quad (3)$$

On Step 110, a second probabilities vector may be determined for a second test template of the test suite. In some exemplary embodiments, the second probabilities vector may include a second plurality of coverage probabilities with respect to the set of coverage events. In some exemplary embodiments, coverage probabilities of the first and second test templates may be obtained from the hit probability matrix. In some exemplary embodiments, the plurality of rows in the hit probability matrix may include at least one row that corresponds to the second probabilities vector and is different than the row that corresponds to the first probabilities vector.

On Step 120, the first test template may be determined to be statistically dominant over the second test template, for example, based on a statistical comparison between the first probabilities vector and the second probabilities vector. In some exemplary embodiments, the statistical comparison may include a comparison between a row of the hit probability matrix that corresponds to the second probabilities vector and a row of the hit probability matrix that corresponds to the first probabilities vector. In some exemplary embodiments, coverage probabilities of the hit probability matrix may be processed to represent a statistically significant probability, for example, prior to the statistical comparison.

In some exemplary embodiments, the first test template may be determined to be statistically dominant over the second test template based on a determination that none of the coverage probabilities of the first probabilities vector is lower in a statistically significant manner than corresponding coverage probabilities of the second probabilities vector, and that at least one coverage probability of the first probabilities vector is higher in a statistically significant manner than a corresponding coverage probability of the second probabilities vector. In some exemplary embodiments, the statistically dominant test template may be determined while excluding well-covered events, frequently covered events, or the like, from the calculation.

In other cases, the first and second test templates may not have a statistically dominant relation at all. For example, if a first group of coverage probabilities of the first probabilities vector is determined to be higher in a statistically significant manner than corresponding coverage probabilities of the second probabilities vector, but a second group of coverage probabilities of the first probabilities vector is determined to be lower in a statistically significant manner than corresponding coverage probabilities of the second probabilities vector, no statistically dominant relation between the first and second test templates may be identified.

In some exemplary embodiments, the statistical comparison may be implemented for every possible pair of test templates of the test suite, for example, to identify pairs of templates that uphold the rule that one template in the pair has a better coverage in a statistically significant manner than the other one with respect to a set of coverage events that may exclude any well-covered or frequently covered events. When such as pair is detected, the inferior template may be removed from the test suite, or a removal recommendation may be generated.

In some exemplary embodiments, the statistical comparison may utilize, for each compared pair of templates, statistical data such as a number of executions for each template, a number of executions that hit the event per event per template, a global number of hits for every event, how well the test covers the desired areas, or the like.

In some exemplary embodiments, statistically dominant relations between test templates may be identified by implementing the statistical comparison for each pair of test template T and coverage event E, denoted {T, E}, of the test suite. In some exemplary embodiments, empirical hit counts of each pair {T, E} may be accumulated, for example, to determine a probability of test template T to hit or activate coverage event E. For each coverage event E, a statistically significant probability that the test template T will hit the coverage event E, denoted P{T, E}, may be estimated by implementing a probability distribution such as a Beta distribution.

In some exemplary embodiments, a probability that a first template, denoted T1, hits a coverage event E more successfully than a second template, denoted T2, may be calculated by comparing their statistically significant success rates of hitting event E, e.g., as follows:

$$P(P\{T1,E\}>P\{T2,E\}) \quad (4)$$

In some exemplary embodiments, it may be assumed that the performances of templates T1 and T2 are statistically independent. Accordingly, Equation 4 may be calculated, e.g., as follows:

$$\int_0^1 P(P\{T1,E\}>z*P\{T2,E\}=z)dz \quad (5)$$

In some exemplary embodiments, an algorithm implementing the statistical comparison between a first and second test template settings, denoted T1 and T2, may perform acts associated with any of the steps, e.g., as follows:

1. For each coverage event covered by either T1 or T2:
   Calculate a probability (denoted "P") that the actual probability of T1 to hit the coverage event is higher than the actual probability of T2 to hit the coverage event.
   If the coverage event appears only in one of the template settings, a probability value of "0" or "1" may be returned, respectively. For example, if the coverage event appears only in the T1, a value of "1" may be returned, and if the coverage event appears only in T2, a value of "0" may be returned.
   If a value of P is determined to be higher in a statistically significant manner than 50%, a value of "1" may be returned. If a value of P is determined to be lower in a statistically significant manner than 50%, a value of "4" may be returned. Otherwise, if a value of P is determined to be near to 50%, or equal to 50% in a statistically significant manner, a value of "0" may be returned. Wherein a statistically significant manner may relate to 50%+/−D (D<50%), where D may be determined by a user.
2. If for each event a returned value is non-negative, and some returned values are positive, return a sum of the returned values.
3. If for each event a returned value is non-positive, and some returned values are negative, return a sum of the returned values.
4. If for each event a returned value is zero, return a value of zero.
5. Remove coverage events that are frequently hit and return to step 2.
6. Remove coverage events that are well hit by both T1 and T2 and return to step 2.
7. Return "no statistically dominant relation found".

In some exemplary embodiments, the algorithm may be executed iteratively on every pair of templates. Each step of the algorithm may be performed in a subsequent manner, until returning a value. Step 1 may iteratively compare coverage results achieved by each pair of templates. Step 1 may provide to Step 2 resulting values for each coverage event for each compared pair of templates, indicating which templates achieves a better coverage then their paired template in a statistically significant manner for each event. For each simulation in Step 1, a test template used to generate the test may be captured, as well as the resulting value indicating a pass or fail, the number of cycles simulated, the simulation model, or the like.

In some exemplary embodiments, if resulting values of T1 are always found to be better or equal than resulting values of T2, Step 2 may return a positive value indicating that T1 is statistically dominant over T2 and the algorithm may terminate. If resulting values of T1 are always found to be worse or equal than resulting values of T2, Step 3 may return a negative value indicating that T2 is statistically dominant over T1 and the algorithm may terminate. If resulting values of T1 are always found to be equal to resulting values of T2, Step 4 may return a zero value indicating that T1 is statistically equal to T2 and the algorithm may terminate. However, if some resulting values of T1 are better than resulting values of T2 for the same events, but others are worse, the algorithm may continue to Steps 5 and 6, subsequently, which may determine whether one or more results may be ignored for being irrelevant. If both Step 5 and Step 6 do not change the situation, no statistically dominant relation may be identified between T1 and T2.

In some exemplary embodiments, test templates that return a value that is lower than a predefined value V (in this case V<=0) for at least one pair comparison, may be removed from the test suite. For example, if a pair of test templates returns a negative number and the algorithm terminates at Step 3, the first test template may be removed from the test suite. In another example, if a pair of test templates returns a positive number and the algorithm terminates at Step 2, the second test template may be removed from the test suite. In other cases, the predefined value V may be determined in any other way, causing the algorithm to be modified accordingly. For example, negative values may be swapped with positive values.

In some exemplary embodiments, a probability that a chance that one test template settings hits a given coverage event better than another is higher than a high predefined threshold such as 70-80%, may be determined based on corresponding statistical formulas. In other cases, a lower threshold may be used.

On Step 130, an output may be provided based on the determination of the statistically dominant test template. In some exemplary embodiments, a recommendation to remove the second test template may be generated as the output. In some exemplary embodiments, the second test template may be removed from the test suite, whereby obtaining a reduced test suite as the output. Accordingly, a system may be verified by generating tests to test the system based on the reduced test suite and executing the tests to test the system.

In some exemplary embodiments, the method may be performed iteratively for every remaining pair of templates in the reduced test suite.

In some cases, the reduced test suite may be utilized to test a system by determining coverage events for target coverage goals, and selecting a subset of test templates from the reduced test suite to reach the target coverage goal. In some exemplary embodiments, the hit probability matrix may be utilized to find an optimized testing policy for a given set of verification goals, as defined by a coverage space. Specifically, the hit probability matrix may be utilized to determine what test templates are to be selected from the reduced test suite in order to reach the coverage events that correspond to the target coverage goals.

In some exemplary embodiments, given the hit probability matrix, optimization algorithms may be used to find an optimized testing policy that minimizes the total number of tests needed to cover verification goals. In some exemplary embodiments, the testing policy may be configured to statistically cover the identified coverage events based on a statistical analysis of coverage likelihood or probability of tests, that may be generated by a test generator, to cover each coverage event corresponding to the verification goals.

In some exemplary embodiments, the testing policy may be configured to select, from the reduced test suite, test templates having a high probability of covering the identified coverage events, for example, according to the hit probability matrix. In some exemplary embodiments, the testing policy may be configured to select, in addition to test templates, execution parameters thereof such as an order of execution of the test templates, a number of executions per test, generation parameters, or the like. The plurality of test templates, when executed with the execution parameters, may be configured to statistically cover the identified coverage events.

In some exemplary embodiments, the testing policy may be implemented by generating one or more test instances based on the plurality of test templates of the reduced test suite. During testing, coverage of the identified coverage events may be tracked to determine whether the coverage goal was reached. Additionally or alternatively, the coverage goal may be assumed to be reached when the testing policy is implemented in full. During testing, bugs may be identified, such as due to the system under development failing to correctly perform functionalities associated with some of the generated tests.

Figure 2:
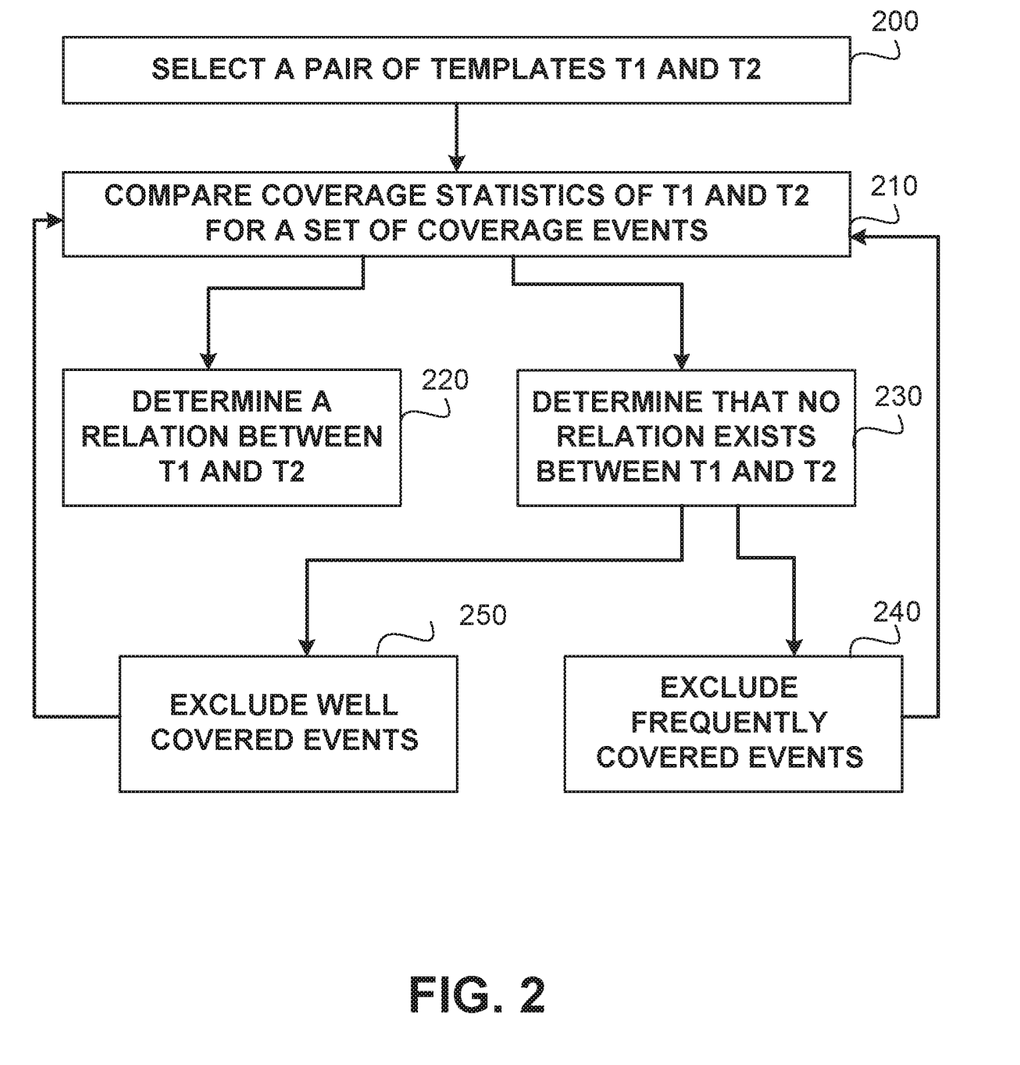
FIG. 2 illustrates a flowchart of a method, in accordance with some exemplary embodiments of the disclosed subject matter.

Referring now to FIG. 2 showing a flowchart diagram of a method implementing the algorithm described above, in accordance with some exemplary embodiments of the disclosed subject matter.

On Step 200, a pair of test templates of a test suite, referred to as T1 and T2, may be selected. In some exemplary embodiments, the method may be performed iteratively for every possible pair of test templates of the test suite, thus each pair of test templates may be selected randomly to some extent, according to a predetermined order, or the like.

On Step 210, a statistical comparison may be implemented to identify whether or not one template in the pair of T1 and T2 has a better coverage in a statistically significant manner than the other one, with respect to a set of coverage events. In some exemplary embodiments, a probability that T1 hits a coverage event more successfully than T2, may be calculated by comparing their statistically significant success rates of hitting the coverage event. In some exemplary embodiments, the statistical comparison may utilize statistical data such as a number of executions for each template of T1 and T2, a number of executions that hit the event per event per template of T1 and T2, a global number of hits for every event, how well the test covers the desired areas, or the like.

In some exemplary embodiments, the statistical comparison may provide resulting values for each coverage event of the set of coverage events. The resulting values for a certain event may indicate which one of T1 and T2 achieves a statistically significant better coverage of the certain event. In some cases, the resulting values for each coverage event may be determined according to predefined settings. For example, the predefined settings may include returning for each coverage event a positive value such as "1" when T1 has a statistically significant better coverage than T2, returning a neutral value such as "0" when both achieve a similar coverage, and returning a negative value such as "−1" when T1 has a statistically significant worse coverage than T2. In other cases, any other associated settings may be defined. For example, an opposite setting may be implemented.

In some exemplary embodiments, the statistical comparison may accumulate the resulting values from each comparison of the probabilities vectors of T1 and T2 with respect to a coverage event. Based on the accumulated resulting values, a statistically dominant relation may or may not be determined. In some cases, if a statistically dominant relation between T1 and T2 is detected, the method may continue to Step 220. Otherwise, the method may continue to Step 230.

On Step 220, a type of a statistically dominant relation may be determined based on the accumulated resulting values. In some cases, if all resulting values are values of "1" or "0", it may be determined that T1 is statistically dominant over T2. In some cases, if all resulting values are values of "−1" or "0", it may be determined that T2 is statistically dominant over T1. Accordingly, a recommendation to remove the inferior template may be generated. In some cases, if all resulting values are values of "0", it may be determined that T1 is statistically equal to T2. In some cases, when T1 is determined to be statistically equal to T2, any one of them, or none of them, may be determined to be the inferior template.

On Step 230, a statistically dominant relation may not be identified. For example, this may be the case when some resulting values are negative and some are positive. In some exemplary embodiments, in this case, it may not be clear whether one of T1 or T2 is statistically dominant over the other, or whether they have no statistically dominant relation. In some cases, Step 230 may continue to Step 240 for further determinations.

On Step 240, one or more frequently covered events may be identified. In some exemplary embodiments, the frequently covered events may have, for a plurality of test templates of the test suite, a coverage probability that is above a frequently covering threshold. In some exemplary embodiments, the frequently covering threshold may be determined based on a percentage of executed tests that covered the frequently covered events during a time frame. In some cases, the frequently covering threshold may be determined to be more than 1 coverage per 1,000 test executions, or any other determined percentage or threshold.

In some exemplary embodiments, the frequently covered events may be excluded from the set of coverage events. In some cases, Step 240 may return to Step 210 for a new iteration. In some exemplary embodiments, this time, the frequently covered events may not be used for determination of the resulting values from Step 210.

In some exemplary embodiments, if the new iteration continues to Step 230, the method may continue to Step 250.

On Step 250, one or more well-covered events from the set of coverage events may be identified. In some exemplary embodiments, a well-covered event may be determined to have, for T1 and T2, coverage probabilities that are above a well covering threshold. In some exemplary embodiments, the well covering threshold may be determined based on a percentage of executed tests generated based on T1 and T2 that covered the well-covered event during a time frame. For example, if the well covering threshold is 10%, then an event may be considered well-covered when at least 10% of all executed tests generated based on T1 and T2 cover the event.

In some exemplary embodiments, the well-covered events may be excluded from the set of coverage events. In some cases, Step 250 may return to Step 210 for another iteration. In some exemplary embodiments, this time, the well-covered events, as well as the frequently covered events, may not be used for determination of the resulting values from Step 210.

In some exemplary embodiments, if the new iteration continues to Step 230, it may be determined that T1 and T2 do not have a statistically dominant relation and no inferior test template may be identified from comparing T1 to T2.

In some exemplary embodiments, during the first iteration, Step 230 may continue to Step 250 instead of 240, and in a next iteration, if invoked, Step 230 may continue to Step 240. In some cases, each of Step 240 and Step 250 may only be performed once for each comparison of a pair of test templates of the test suite. In some exemplary embodiments, upon reaching Step 220, the method may terminate and return a determined statistically dominant relation between T1 and T2. In some exemplary embodiments, all determined statistically dominant relations may be gathered to provide a reduced test suite based thereon.

Figure 3:
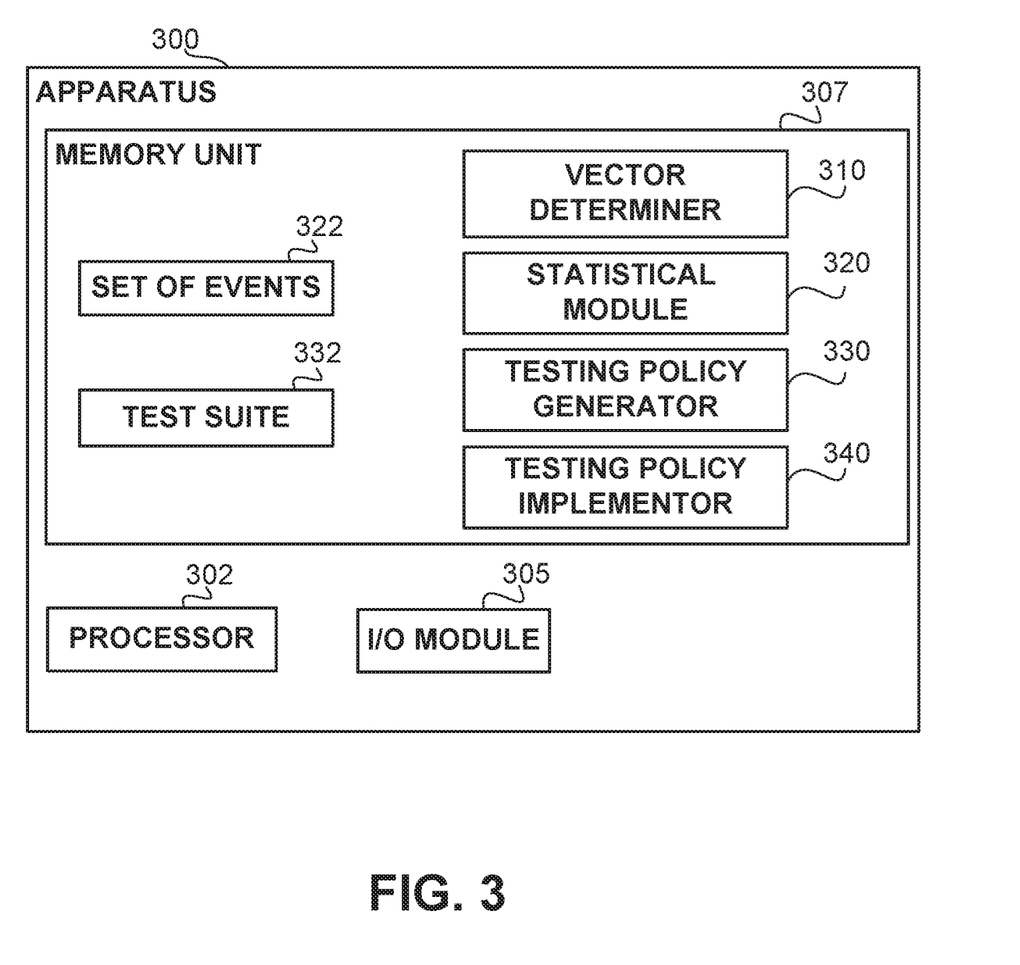
FIG. 3 shows a block diagram of an apparatus, in accordance with some exemplary embodiments of the disclosed subject matter.

Referring now to FIG. 3 showing a block diagram of components of an apparatus, in accordance with some exemplary embodiments of the disclosed subject matter.

In some exemplary embodiments, Apparatus 300 may comprise a Processor 302. Processor 302 may be a Central Processing Unit (CPU), a microprocessor, an electronic circuit, an Integrated Circuit (IC) or the like. Processor 302 may be utilized to perform computations required by Apparatus 300 or any of its subcomponents. Processor 302 may be configured to execute computer-programs useful in performing the methods of FIGS. 1, 2, or the like.

In some exemplary embodiments of the disclosed subject matter, an Input/Output (I/O) Module 305 may be utilized to provide an output to and receive input from a user. I/O Module 305 may be operatively coupled to a system under development (not shown) intended for verification, a simulator thereof, an emulator thereof, or the like. I/O Module 305 may be operatively coupled to a peripheral device enabling a user to interact with Apparatus 300, such as a display, a keyboard, or the like. I/O Module 305 may further be used to transmit and receive information to and from the user, the system under development, or any other apparatus in communication therewith.

In some exemplary embodiments, Apparatus 300 may comprise a Memory Unit 307. Memory Unit 307 may be a short-term storage device or long-term storage device. Memory Unit 307 may be a persistent storage or volatile storage. Memory Unit 307 may be a disk drive, a Flash disk, a Random Access Memory (RAM), a memory chip, or the like. In some exemplary embodiments, Memory Unit 307 may retain program code operative to cause Processor 302 to perform acts associated with any of the subcomponents of Apparatus 300. In some exemplary embodiments, Memory Unit 307 may retain program code operative to cause Processor 302 to perform acts associated with any of the steps in FIGS. 1, 2, or the like.

The components detailed below may be implemented as one or more sets of interrelated computer instructions, executed for example by Processor 302 or by another processor. The components may be arranged as one or more executable files, dynamic libraries, static libraries, methods, functions, services, or the like, programmed in any programming language and under any computing environment.

In some exemplary embodiments, Vector Determiner 310 may be configured to receive coverage probability information from a hit probability matrix, test submission tools, version control systems, bug tracking tools, or the like, e.g., via I/O Module 305. Vector Determiner 310 may be configured to determine a first probabilities vector for a first test template of a Test Suite 332, and a second probabilities vector for a second test template of Test Suite 332. In some exemplary embodiments, the first probabilities vector may include first coverage probabilities for covering a Set of Events 322, and the second probabilities vector may include second coverage probabilities for covering Set of Events 322.

Statistical Module 320 may be configured to statistically compare the first probabilities vector and the second probabilities vector. In some exemplary embodiments, Statistical Module 320 may determine whether the first probabilities vector is scored higher in a statistically significant manner than the second probabilities vector, whether the first probabilities vector is scored lower in a statistically significant manner than the second probabilities vector, whether the first probabilities vector is equal in a statistically significant manner to the second probabilities vector, or whether no relation is found.

In some exemplary embodiments, Statistical Module 320 may be configured to statistically compare every possible pair of test templates of Test Suite 332, for example, to identify pairs of templates that uphold the rule that one template in the pair has a better coverage in a statistically significant manner than the other one with respect to Set of Events 322. When such as pair is detected, the inferior template may be removed from the test suite, or a removal recommendation to remove the inferior template may be generated.

In some cases, Statistical Module 320 may be configured to determine that the first test template is statistically dominant over the second test template based on a determination that none of the coverage probabilities of the first probabilities vector is lower in a statistically significant manner than a corresponding coverage probability of the second probabilities vector, and that at least one coverage probability of the first probabilities vector is higher in a statistically significant manner than a corresponding coverage probability of the second probabilities vector.

In some cases, if no relation is found between the first and second probabilities vectors, Statistical Module 320 may be configured to identify one or more frequently covered events in Set of Events 322 and exclude them from Set of Events 322. In some exemplary embodiments, the frequently covered events may have, for a plurality of test templates of Test Suite 332, a coverage probability that is above a frequently covering threshold. In some cases, Statistical Module 320 may be configured to determine that the first test template is statistically dominant over the second test template even if the coverage probabilities of the frequently covered events is lower at the first probabilities vector compared to the second probabilities vector.

In some cases, Statistical Module 320 may be configured to identify one or more well-covered events in Set of Events 322 and exclude them from Set of Events 322. In some exemplary embodiments, the well-covered events may have, for a plurality of test templates of Test Suite 332, a coverage probability that is above a well covering threshold. In some cases, Statistical Module 320 may be configured to determine that the first test template is statistically dominant over the second test template even if the coverage probabilities of the well-covered events is lower at the first probabilities vector compared to the second probabilities vector.

In some exemplary embodiments, based on the determination of Statistical Module 320, the second test template may be removed from Test Suite 332, for example, by the user or automatically by Statistical Module 320. In some exemplary embodiments, a reduced Test Suite 332 may be used for further testing or verification phases of a system under development.

Testing Policy Generator 330 may determine a testing policy for the system under development, which may be configured to statistically cover target events. Testing Policy Generator 330 may be configured to utilize a coverage likelihood of each coverage event by each test template appearing in reduced Test Suite 332 for determining the testing policy.

Testing Policy Implementor 340 may implement the testing policy determined by Testing Policy Generator 330. In some exemplary embodiments, Testing Policy Implementor 340 may generate one or more tests based on the test templates indicated in the testing policy to test a system under development. In some exemplary embodiments, Testing Policy Implementor 340 may utilize generation parameters defined in the testing policy.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:

determining, for a first test template of a test suite, a first probabilities vector comprising a first plurality of coverage probabilities with respect to a set of coverage events, wherein a coverage probability of a test template indicates a probability of covering a corresponding coverage event by a test that is generated based on the test template, wherein the coverage probability of the test template is determined based on a count of tests that are generated using the test template and cover the coverage event out of a total count of tests that are generated using the test template;

determining, for a second test template of the test suite, a second probabilities vector comprising a second plurality of coverage probabilities with respect to the set of coverage events;

determining that the first test template is statistically dominant over the second test template based on the first probabilities vector and based on the second probabilities vector; and providing an output based on the determination of the statistically dominant test template.

2. The method of claim 1, wherein said providing the output comprises indicating a removal of the second test template from the test suite, whereby obtaining a reduced test suite; and wherein said method further comprises verifying a system by generating tests based on the reduced test suite and executing the tests to test the system.

3. The method of claim 1, wherein said providing the output comprises removing the second test template from the test suite, whereby obtaining a reduced test suite; and wherein the method further comprises: utilizing the reduced test suite to test a system, wherein said utilizing comprises:

determining coverage events for a target coverage goal;

selecting a subset of test templates from the reduced test suite based on the coverage events, wherein said selecting is performed based on coverage probabilities of the test templates of the reduced test suite with respect to the coverage events; and verifying the system by generating tests based only on the subset of test templates.

4. The method of claim 1, wherein said determining that the first test template is statistically dominant over the second test template comprises:

determining that none of the first plurality of coverage probabilities of the first probabilities vector is lower in a statistically significant manner than a corresponding coverage probability of the second plurality of coverage probabilities of the second probabilities vector; and determining that at least one coverage probability of the first probabilities vector is higher in a statistically significant manner than a corresponding coverage probability of the second probabilities vector.

5. The method of claim 1 further comprising:

excluding from the set of coverage events a frequently covered event, wherein the frequently covered event has, for a plurality of test templates in the test suite, a coverage probability that is above a frequently covering threshold.

6. The method of claim 5, wherein a probability of covering the frequently covered event by the first test template is lower in a statistically significant manner than a probability of covering the frequently covered event by the second test template.

7. The method of claim 5, wherein the frequently covering threshold is a percentage of executed tests that covered the frequently covered event during a time frame.

8. The method of claim 7, wherein the percentage of executed tests that covered the frequently covered event is more than 1 coverage per 1,000 test executions.

9. The method of claim 1 further comprises: excluding from the set of coverage events a well-covered event, wherein the well-covered event has, for the first and second test templates, corresponding coverage probabilities that are above a well covering threshold.

10. The method of claim 9, wherein the well covering threshold is at least 10%.

11. The method of claim 9, wherein a probability of covering the well-covered event by the first test template is lower in a statistically significant manner than a probability of covering the well-covered event by the second test template.

12. A computer program product comprising a non-transitory computer readable storage medium retaining program instructions, which program instructions when read by a processor, cause the processor to perform a method including:

determining, for a first test template of a test suite, a first probabilities vector comprising a first plurality of coverage probabilities with respect to a set of coverage events, wherein a coverage probability of a test template indicates a probability of covering a corresponding coverage event by a test that is generated based on the test template, wherein the coverage probability of the test template is determined based on a count of tests that are generated using the test template and cover the coverage event out of a total count of tests that are generated using the test template;

determining, for a second test template of the test suite, a second probabilities vector comprising a second plurality of coverage probabilities with respect to the set of coverage events;

determining that the first test template is statistically dominant over the second test template based on the first probabilities vector and based on the second probabilities vector; and providing an output based on the determination of the statistically dominant test template.

13. The computer program product of claim 12, wherein said providing the output comprises indicating a removal of the second test template from the test suite, whereby obtaining a reduced test suite; and wherein the instructions, when read by the processor, cause the processor to verify a system by generating tests based on the reduced test suite and execute the tests to test the system.

14. The computer program product of claim 12, wherein said providing the output comprises removing the second test template from the test suite, whereby obtaining a reduced test suite; and wherein the instructions, when read by the processor, cause the processor to utilize the reduced test suite to test a system, wherein said utilizing comprises:

determining coverage events for a target coverage goal;

selecting a subset of test templates from the reduced test suite based on the coverage events, wherein said selecting is performed based on coverage probabilities of the test templates of the reduced test suite with respect to the coverage events; and verifying the system by generating tests based only on the subset of test templates.

15. The computer program product of claim 12, wherein said determining that the first test template is statistically dominant over the second test template comprises:

determining that none of the first plurality of coverage probabilities of the first probabilities vector is lower in a statistically significant manner than a corresponding coverage probability of the second plurality of coverage probabilities of the second probabilities vector; and determining that at least one coverage probability of the first probabilities vector is higher in a statistically significant manner than a corresponding coverage probability of the second probabilities vector.

16. The computer program product of claim 12 further comprising:

excluding from the set of coverage events a frequently covered event, wherein the frequently covered event has, for a plurality of test templates in the test suite, a coverage probability that is above a frequently covering threshold.

17. The computer program product of claim 12 further comprises: excluding from the set of coverage events a well-covered event, wherein the well-covered event has, for the first and second test templates, corresponding coverage probabilities that are above a well covering threshold.

18. The computer program product of claim 17, wherein the well covering threshold is at least 10%.

19. The computer program product of claim 17, wherein a probability of covering the well-covered event by the first test template is lower in a statistically significant manner than a probability of covering the well-covered event by the second test template.

20. A computerized apparatus having a processor, the processor being adapted to perform the steps of:

determining, for a first test template of a test suite, a first probabilities vector comprising a first plurality of coverage probabilities with respect to a set of coverage events, wherein a coverage probability of a test template indicates a probability of covering a corresponding coverage event by a test that is generated based on the test template, wherein the coverage probability of the test template is determined based on a count of tests that are generated using the test template and cover the coverage event out of a total count of tests that are generated using the test template;

determining, for a second test template of the test suite, a second probabilities vector comprising a second plurality of coverage probabilities with respect to the set of coverage events;

determining that the first test template is statistically dominant over the second test template based on the first probabilities vector and based on the second probabilities vector; and providing an output based on the determination of the statistically dominant test template.

* * * * *